United States Patent [19]

Kraus

[11] 4,408,503
[45] Oct. 11, 1983

[54] TRACTION ROLLER TRANSMISSION

[75] Inventor: Charles E. Kraus, Austin, Tex.

[73] Assignee: Excelermatic Inc., Austin, Tex.

[21] Appl. No.: 241,242

[22] Filed: Mar. 6, 1981

[51] Int. Cl.³ .................. F16H 13/06; F16H 13/10; F16H 13/00; F16H 55/34

[52] U.S. Cl. ............................. 74/798; 74/206; 74/208; 74/211; 74/209; 74/214

[58] Field of Search .............. 74/208, 209, 211, 214, 74/216, 206, 798, 755, 201, 202, 200; 384/420, 398

[56] References Cited

U.S. PATENT DOCUMENTS

| | | | |
|---|---|---|---|
| 3,013,439 | 12/1961 | Le Voci | 74/209 |
| 3,707,888 | 1/1973 | Schottler | 74/208 |
| 3,776,051 | 12/1973 | Kraus | 74/206 |
| 3,848,746 | 11/1974 | Kraus | 74/206 |
| 3,898,814 | 8/1975 | Chou et al. | 74/206 |
| 3,941,004 | 3/1976 | Kraus | 74/206 |
| 4,052,915 | 10/1977 | Kraus | 74/206 |
| 4,215,595 | 8/1980 | Kraus | 74/208 |
| 4,224,840 | 9/1980 | Kraus | 74/208 |

*Primary Examiner*—Lawrence J. Staab
*Assistant Examiner*—Michael D. Bednarek
*Attorney, Agent, or Firm*—Klaus J. Bach

[57] ABSTRACT

A traction roller transmission which has a sun roller disposed within a traction ring and traction rollers disposed in the space between, and in engagement with, the sun roller and the traction ring for the transmission of motion therebetween. The traction roller has side faces disposed adjacent an annular guide structure which is arranged in parallel radial alignment with the traction ring for guiding the traction rollers into parallel alignment with the traction ring. Means are provided for resiliently ringing the guide structure toward the traction rollers so as to permit lubricant to be drawn between the traction roller side faces and guide structure and to form therebetween a lubricant pad adapted to lift the guide structure of the traction roller side faces and to steer the traction rollers into parallel alignment with the traction ring.

8 Claims, 2 Drawing Figures

TRACTION ROLLER TRANSMISSION

BACKGROUND OF THE INVENTION

The invention relates to a traction roller transmission with fixed transmission ratio, particularly to a planetary-type traction roller transmission.

Such a transmission includes a traction ring having disposed therein a sun roller and planetary rollers arranged in the annular space between and in engagement with, the sun roller and the traction ring for the transmission of motion between the sun roller and the traction ring. As disclosed in the present inventor's earlier U.S. Pat. No. 3,776,051, the sun roller may be so arranged that its axis is parallel to, but spaced from, the axis of the traction ring such that the annular space between the sun roller and the traction ring is of varying width and the traction rollers are so arranged that at least one of them is pulled by the reaction forces into a narrowing section of the annular space when a torque is transmitted, thereby causing firm engagement of the traction rollers with the traction ring and the sun roller.

However, if the traction roller axes are not perfectly parallel with the axis of the sun roller and the traction ring, large axial forces are generated which cause large axial bearing loads on all transmission bearings. In the arrangement according to the present inventor's earlier U.S. Pat. No. 3,941,004, the traction ring has annular guide rails provided with guide surfaces which are disposed adjacent the side faces of the traction rollers in closely spaced relationship such that, during operation of the transmission, lubricant present in the transmission and adhering to the guide surfaces and annular side faces is drawn into the gaps therebetween and forms therein pressurized lubricant pads which steer the traction rollers into parallel alignment with the traction ring.

It has been found however, that, during high speed operation, the lubricant shear losses in said gaps become relatively large. Furthermore, it has been found that particulate matter entering the narrow gap causes wear of the guide surfaces.

SUMMARY OF THE INVENTION

In a traction roller transmission in which traction rollers are disposed in an annular space between a traction ring and a sun roller, with which they are in engagement for the transmission of motion therebetween, an annular guide structure is provided adjacent the side faces of the traction rollers and the guide structure is resiliently urged toward the traction rollers for guiding the traction rollers into parallel alignment with the traction ring. Lubricant adhering to the guide structure and the side faces of the traction rollers however is permitted to form a lubricant pad therebetween adapted to lift the guide structure off the roller side faces to reduce shear losses and prevent wear of the guide structure and roller side faces.

DESCRIPTION OF A PREFERRED EMBODIMENT

Figure 1:
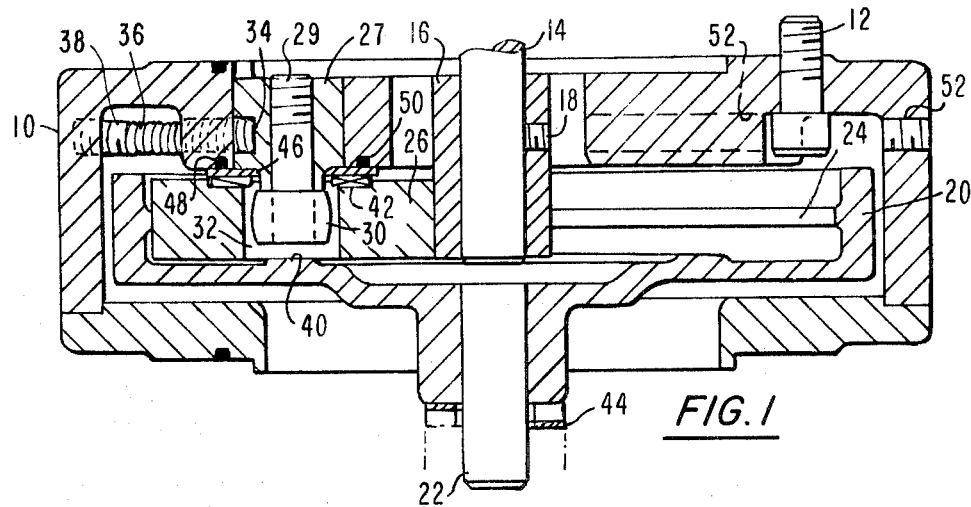
FIG. 1 shows, in axial cross-section, a planetary type traction roller transmission including the present invention.

The traction roller transmission shown in FIG. 1 is actually designed for being mounted with its housing 10 onto a motor by means of bolts 12. The motor has a shaft 14 adapted to be received in a sun roller 16 of the transmission, the sun roller 16 being fastened to the motor shaft by means of set screw 18. In this particular application, in which the motor shaft 14 is the transmission input shaft, the transmission is a speed-reducing device. A traction ring structure 20 mounted on an output shaft 22 is disposed within the housing 10 and has an annular rolling surface area 24 projecting radially inwardly. The sun roller 16 extends into the traction ring 20 but its axis is spaced from the axis of the output shaft 22 to form an annular path of varying width between the sun roller 16 and the traction ring 20 as can be seen from FIG. 2. Traction rollers 26 and 28 are disposed in the annular path between the sun roller 16 and the traction ring 20 and are in engagement with both for the transmission of motion therebetween. Depending on the direction of rotation of the transmission either one of the traction rollers 26 and 28 is pulled into the narrowing gap between the sun roller 16 and the traction ring 20 for firm frictional engagement of the traction rollers 26, 28 with the sun roller 16 and the traction ring 20, while the other roller is held in position within the annular path by a mechanism as explained in U.S. Pat. No. 3,776,051.

Figure 2:
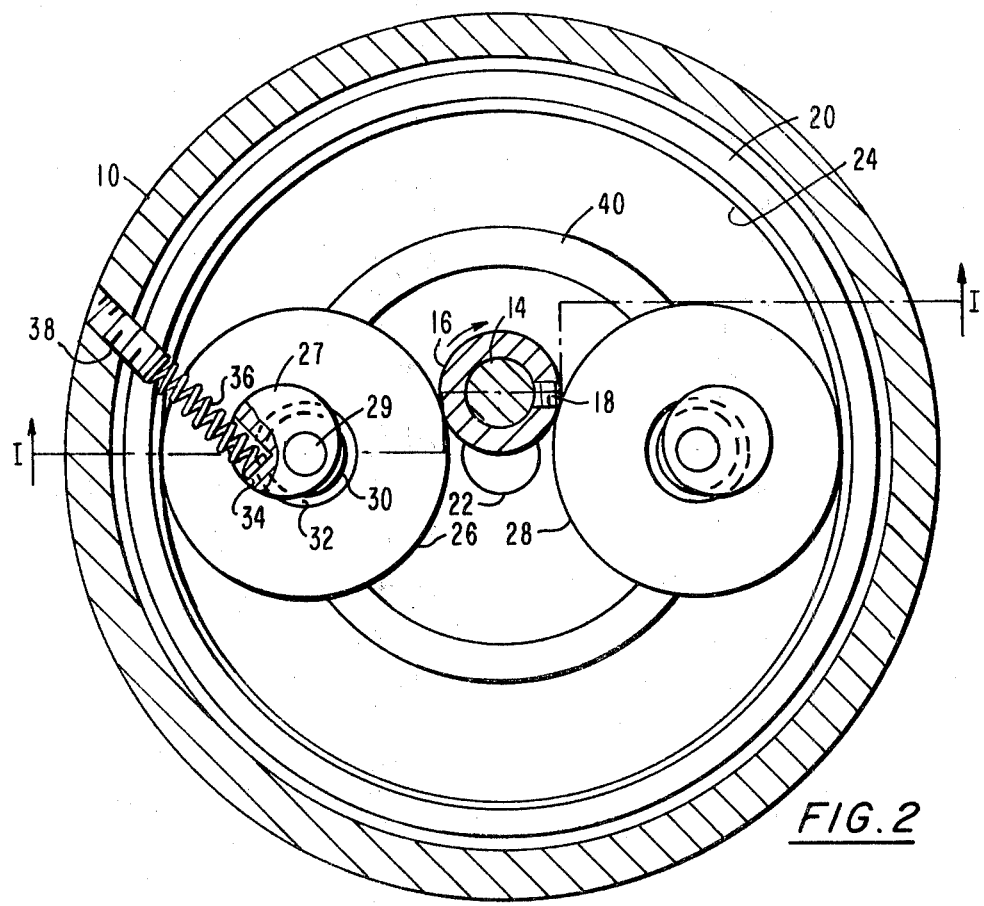
FIG. 2 is a view of the transmission in transverse cross-section to show an arrangement with two planetary traction rollers disposed in the annular space between the sun roller and the traction ring.

The traction rollers 26, 28 are supported in the housing 10 by means of pivotal eccenters 27 which have bolts 29 mounted therein and bearing heads 30 extending into central support openings 32 in the traction rollers 26, 28. The bearing heads 30 are slightly curved to provide for central support forces for the traction rollers. One of the eccenters, as shown in FIG. 2, the eccenter 27 of traction roller 26 is provided with a ledge 34 on which a spring 36 is seated whose force is adjustable by an adjustment screw 38 to permit the traction roller 26 to be forced with a predetermined preload force into the narrowing path between the sun roller 16 and the traction ring 22. The traction ring 20 is also provided with an annular guide pad 40 arranged at the traction rings side face, which guide pad 40 guides the traction rollers 26, 28 into perfect alignment with the traction ring 20. The axial guide forces applied to the traction rollers 26, 28 by the guide pad 40 are taken up by axial thrust bearings 42 which axially support the traction rollers 26, 28 against the transmission housing 10 or the eccenters 27 mounted in the housing 10.

During high transmission speeds, however, lubricant drawn between the guide pad 40 and the traction roller side faces causes relatively large shear losses and, since the clearance is very small (0.002–0.003 inches) particulate matter suspended in the lubricant may cause rapid deterioration of the guide pad surfaces and the roller side faces. Traction ring and traction rollers are therefore resiliently supported relative to each other suich that the clearance may become larger at high speeds or when particulate matter enters the clearance space. Obtained is this result by a resilient axial support for the traction ring 22 by means of a wave spring 44 which biases the traction ring 22 axially against the rollers 26 and 28, the axial bias force being taken up by the axial thrust bearings 42. As shown in FIG. 1 the axial thrust bearings 42 have races 46 which rest on O-rings 48 disposed in housing grooves 50. The O-rings 48 project slightly from the housing 10 to form a resilient bearing support which permits radial alignment of the bearings with the traction rollers 26, 28.

Axial support can be provided for the traction rollers 26, 28 also by a hydrostatic axial thrust bearing if pressurized lubricant is available. In this case no special structure would be necessary for resilient axial bearing support.

As mentioned before, the traction roller transmission as shown in FIG. 1 is designed to be mounted onto a motor by means of bolts 12, the motor shaft extending into the sun roller 16. An access hole 52 extends through the housing 10 and is adapted to receive an Allen wrench to permit tightening at set screw 18.

During operation the motor shaft carrying the sun roller 16 is firmly positioned relative to the housing 10 and drives the traction rollers 26 and 28 which are engaged between the sun roller 16 and the traction ring 20 for transmitting motion from the sun roller 16 to the traction ring 20. Clockwise rotation of the sun roller will cause the traction roller 26 to be pulled further into the narrowing annular gap between the sun roller 16 and the traction ring for firm engagement of the traction rollers 26, 28 with the sun roller and the traction ring. Traction roller 28 is prevented by its support structure from moving out of the narrowing area of the gap. A preload is applied by preload spring 36 to always provide for engagement, and prevent slippage, between the sun and the traction rollers at the beginning of operation.

At zero speed, the clearance between the traction rollers 26, 28 and the guide surface 40 of the traction ring 22 is zero. During operation, the clearance increases with increasing transmission speed as an increasing amount of lubricant is drawn between the traction roller side faces and the traction ring guide surfaces. As a result the traction ring is lifted off the roller side faces against the force of the wave spring 44 biasing the traction ring toward the traction rollers. The wave spring 44 however does not need to exert a high force. Adequate forces will be developed by the lubricant in the clearance area to guide the rollers in proper alignment with the traction ring.

Guide forces can be provided in ways other than shown in the drawings. It would, for example, be possible to have a guide flange associated with the sun roller at one side of the traction rollers while a spring loaded flange is axially movably disposed on the sun roller at the other side of the traction rollers. The traction rollers would then be guided by the guide flange against which they would be biased by the spring loaded flange.

It is also noted that the present invention is not limited to an arrangement with two traction rollers as disclosed herein. The invention is rather equally applicable to traction roller transmissions with any amount of traction rollers, for example, to a traction roller transmission with three traction rollers such as disclosed in the present inventor's earlier U.S. Pat. Nos. 3,776,051 and 3,941,004.

What I claim is:

1. A traction roller transmission comprising at least two rotatable means having axes of rotation and having circular traction surfaces disposed in frictional engagement with each other, one of said rotatable means having an annular face area at least at one side thereof; guide means provided with a guide surface arranged adjacent said one, and in a plane normal to the axis of the other, of said rotatable means, said guide surface being radially spaced from the traction surface of said other rotatable means such that, during operation of said transmission, said annular face area and said guide surface are in motion relative to each other; and means for resiliently forcing said one rotatable means toward said guide means permitting lubricant present in the transmission and adhering to said annular face area and said guide surface and drawn between said annular face area and said guide surface to form a pad therebetween adapted to provide a clearance between said guide surface and the face area of said one rotatable means which increases with the relative speed between said annular face and said guide surface thereby reducing high speed shear losses and permitting passage of particulate matter while firmly steering said one rotatable means into parallel axial alignment with the other rotatable means.

2. A traction roller transmission comprising: a traction ring having an inner traction race; a sun roller arranged within said traction ring, said sun roller having a traction surface spaced from the race of said traction ring to form an annular path therebetween; a number of motion transmitting traction rollers disposed in said annular path and being in engagement with said traction ring race and the sun roller surface for the transmission of motion therebetween; an annular guide structure arranged adjacent said traction rollers and in a plane normal to the axis of said traction ring, said traction rollers having annular side faces adjacent said annular guide structure, means for resiliently forcing said annular guide structure and said traction rollers toward each other permitting lubricant present in the transmission and adhering to said annular guide structure and the traction roller side faces, while being drawn between said annular guide structure and the roller side faces, to form a lubricant pad therebetween adapted to provide for a clearance whose size is dependent on the relative speed between said guide structure and the roller side faces thereby reducing high speed shear losses and permitting passage of particulate matter while firmly steering the traction rollers into parallel alignment with the traction ring.

3. A traction roller transmission as claimed in claim 2, wherein said traction ring is formed at the circumference of a disc and said annular guide structure is formed at the side face of said disc and wherein spring means are provided adjacent said disc for forcing said disc toward said traction rollers.

4. A traction roller transmission as claimed in claim 3, wherein said traction rollers are supported axially by axial thrust bearings providing some degree of elasticity.

5. A traction roller transmission as claimed in claim 4, wherein said axial thrust bearings are roller bearings supported by means of resilient O-rings to provide said degree of elasticity.

6. A traction roller transmission as claimed in claim 4, wherein said traction rollers are radially supported by eccenters pivotally supported in a housing which surrounds said traction ring.

7. A traction roller transmission as claimed in claim 6, wherein said housing is adapted to be mounted on a drive motor and said sun roller is a sleeve adapted to receive and to be firmly mounted on the shaft of said motor.

8. A traction roller transmission as claimed in claim 7, wherein said sun roller is positioned by said motor shaft with its axis parallel to, but spaced from, the axis of said traction ring, such that an annular space of varying width is formed between the sun roller and the traction ring and wherein there are provided two traction rollers, one being rotatably supported relative to said housing and the other being free to be drawn by forces generated by the torque transmitted through the transmission into a narrowing area of said annular space thereby forcing said traction rollers into firm engagement with said sun roller and said traction ring.

* * * * *